Nov. 2, 1948.                H. SONNENFELD                2,452,610
               EXTRUSION MACHINE FOR PRODUCING POWER CABLES
                          Filed Jan. 1, 1945
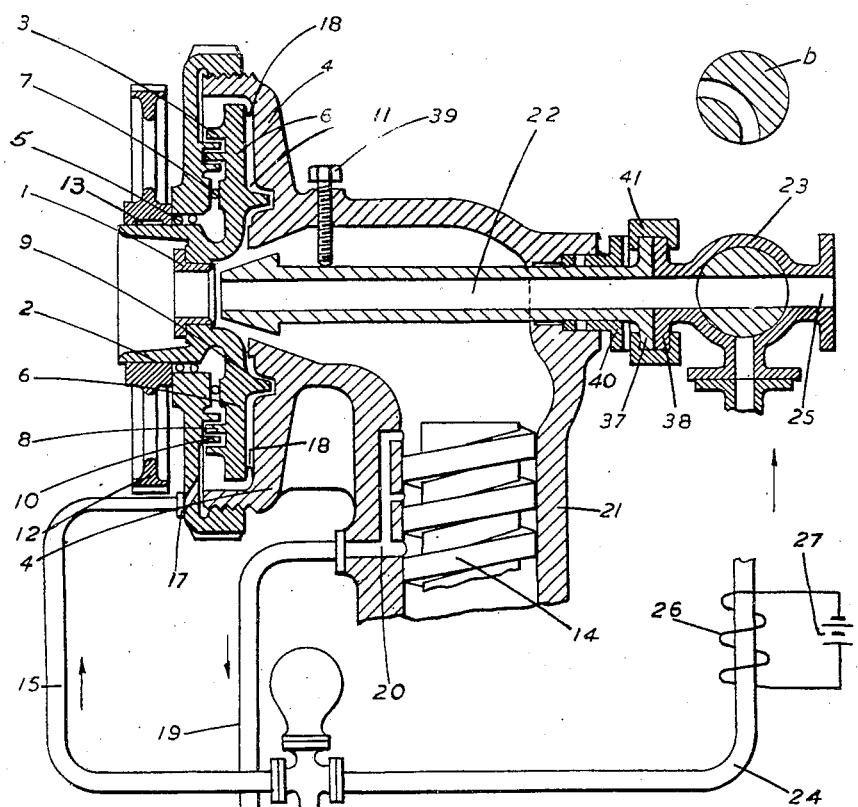
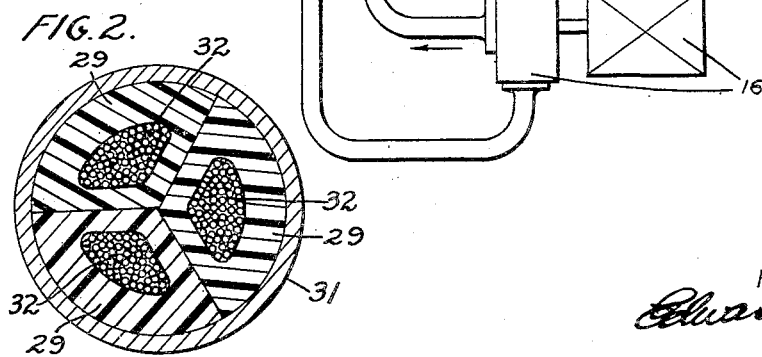
Inventor
Hugo Sonnenfeld
By
Attorney Patented Nov. 2, 1948

2,452,610

UNITED STATES PATENT OFFICE 2,452,610

EXTRUSION MACHINE FOR PRODUCING POWER CABLES

Hugo Sonnenfeld, Bradford, England, assignor to Standard Telephones and Cables Limited, London, England, a British company Application January 1, 1945, Serial No. 570,894
In Great Britain October 26, 1943

4 Claims. (Cl. 18—13)

This invention relates to extrusion machines for making multi-conductor electric power cables and, more particularly, to machines for making multi-conductor cables in which the separate insulated cores are sector shaped.

In the manufacture of multi-conductor power cables the separate cable cores are stranded together to form a complete cable.

It is normal practice to call all non-circular core sections "sectors" even when such "sectors" when laid up in the cable require fillers to produce the cross section of the cable or to fill the spaces between them.

It is desirable however that the insulation of a cable should be homogeneous and that in particular loosely packed fillers should not be present in the electrical field where they may increase the possibility of dielectric breakdown. The elimination of fillers necessitates the sub-division of the cable cross-section into $n$-parts, for an $n$-core cable, each part being symmetrical relative to the others and the sum of these parts aggregating substantially to the cable cross-section.

In the present invention a sector core is defined as one which fulfills the above-mentioned requirement for the elimination of fillers.

Sector-shaped cores are more economical in material than circular cores but a cable made up of such cores is inflexible unless the sectors are pretwisted into the configuration they are to occupy in the finished cable before being laid up together in the cable. Such pretwisting presents little difficulty in the case in which each core insulation consists of a lapping around the conductor, e. g. paper that is impregnated with oil or other cable compound, since the lapping can be effected around a pretwisted conductor. If, however, the insulation of each core is to consist of extruded material then it is very difficult, if not impossible, to achieve this pretwisting of the cores by the use of existing machinery. Moreover, it is the practice with "sector" shaped cores to apply the insulation symmetrically about the conductor. This disposition of the insulation is uneconomical with sector cores as defined herein because the same thickness of insulation is not required at all points.

In general in a cable comprising a plurality of cores the apex of the sector will constitute an angle i. e. less than 180°. It is therefore undesirable that the insulation should be symmetrically applied around the conductor which could in such a case be but a replica of the insulated core and would therefore induce a concentration of the electrical field at the apex with the introduction of potential source of breakdown. This would be aggravated by the fact that each core in the plurality of cores present would produce such a concentration of electrical field thereby constituting a serious distortion of the field and increased potentiality of breakdown.

A further advantage of the use of sector cores as herein defined is that the absence of fillers materially increases the compression effect resulting, for instance from the application of an elastic sheath over the laid up cases in the manner set out in U. S. application Serial No. 570,893. If, however, the insulation is to be applied about the cores unsymmetrically so as to avoid such potentiality of breakdown and/or use full economy of material, then the insulation must be applied by extrusion, and as pointed out above, it is impossible or at any rate exceedingly difficult to pretwist the cores.

It is the main object of the present invention to provide a machine to overcome these difficulties, with a view to producing a multi-conductor cable in which the full advantage of sector shaped cores are utilised.

According to one feature of the invention an extrusion machine is provided comprising a radially unsymmetrical die for extrusion of an unsymmetrical body of predetermined lay and means for rotating the die in predetermined relation to the speed of extrusion to the said lay.

By means of this machine each of the cores of a multiconductor cable can be pretwisted whilst extruded insulation is being applied therearound and according to another feature of the invention therefore an electric power cable having a plurality of insulated cores is made in this manner that the cores are pretwisted and subsequently insulated by extrusion, so that the insulated core immediately after extrusion has the configuration which it occupies in the final cable. Preferably the cores are of such shape that when laid up together in a cable they completely fill the cross section of the cable, fillers being then unnecessary. Preferably the conductor of each core is unsymmetrically related with respect to the extruded insulation, whereby full advantage can be taken of the sector shape of the core.

It is, however, to be understood that the extrusion machine according to the invention is well adapted for other uses than that of extruding insulation around a conductor to form a cable core whilst pretwisting said core, inasmuch as it is useful for forming an extruded tube having external or internal helical ribs. Such external ribs might be formed on the exterior of a circular single core cable to induce rigidity, or internal ribs might be formed in the interior of a tube for the purpose of supporting the inner conductor of a coaxial air space communication cable, the external conductor being applied outside the tube.

The invention will be better understood from the following description taken in conjunction with the accompanying drawings in which:

Fig. 1 is a vertical cross sectional view of an extrusion machine according to the invention.

Fig. 2 is a cross section of a multi-conductor cable produced by the machine of Fig. 1.

Referring to the drawings, Fig. 1 shows an extrusion machine according to the invention. The die 1 is fixed in a dieholder 2 which in turn is held in position on the machine by a dieholder cover 3 screwed on to the extrusion head 4. The dieholder 2 carrying the die 1 is mounted for rotation about its own axis, which coincides with the axis of the head 4, on ball bearings 5 between the dieholder cover 3 and the dieholder 2. The latter is formed with a disc flange 6 perpendicular to the axis, the dieholder cover 3 and head 4 being so shaped as to provide a recess within which flange 6 rotates. Thrust bearings 7, preferably ball bearings as shown, are provided between the flange 6 and the dieholder cover 3. The flange 6 is provided with one or more concentric ribs 8, 9 on both sides of the flange and fitting into corresponding grooves 10, 11 in the dieholder cover 3 and head 4 respectively. These ribs and grooves represent known tightening means for tightening the dieholder 2 in the dieholder cover 3 and head 4. A gear wheel 12 is fitted on the dieholder 2 by means of a keyway 13. This gear wheel 12 is driven, by means not shown, at a predetermined speed related to that of the feeding screw 14 for the extruded material, and determined by the speed of passage of the conductor and the desired lay of the insulated core, either by being geared to the driving means for said screw 14 or by being driven by a separate motor having a controlled speed properly related to that of the screw 14. The dieholder 2 with the die 1 is thus rotated as the extruded material is forced through it. The extruded material in passing through the die exerts an axial thrust which is borne by the thrust bearings 7. The guide tube 22 for the conductor to be covered with insulation is formed with a flange 37 fitting tightly against a flange 38 on the end of a passage through a three way cock 23 hereinafter referred to. The guide tube 22 is held in proper position by centralising pins 39 projecting through the head 4 of the machine. The guide tube 22 is rotatable in a bearing 40 in the rear of the head 4.

The axial thrust on the bearings 7 may be partially or wholly compensated by compressed air in the following manner. A pipe 15 connected to an air compressor 16 is connected with a bore 17 in the dieholder cover 3 at a point lying further from the axis than the grooves 10. Thus air pressure is applied to the disc flange 6 of sufficient magnitude to reduce the axial load on the thrust bearings 7. To prevent the compressed air acting upon the opposite side of the flange 6 a cup shaped elastic ring 18 is provided between the flange 6 and the head 4 for this purpose and packing (not shown) is further provided between the dieholder 2 and the cover 3, in case the grooves 10 and ribs 8 fail to be sufficiently tight. In some cases it may be advisable to make allowance for a slight leakage through the grooves and ribs (10, 8) as well as through the thrust bearing 7 and in such cases the die holder 2 may be bored at one or more points so as to allow the escaping air to pass through the holes and cool or assist in cooling the thermoplastic material immediately after it leaves the die. The air compressor 16 is driven by a motor and equipped in the usual way with an air reservoir to render the pressure of the compressed air supplied through pipe 15 more uniform.

The low pressure side of the air compressor 16 may be connected by pipe 19 to bores 20 in the cylinder 21 surrounding the feed screw 14 so as to suck out air contained within the thermoplastic material.

When after the extrusion of a complete length of cable core, the end of the conductor runs through the die 1 and leaves the channel 22 empty, the latter is liable to become obstructed with the thermoplastic material which, under the pressure within the extrusion head follows the path of least resistance, this being the channel 22 which is empty and under atmospheric pressure. This thermoplastic material may carbonise in the channel, but is in any case a serious handicap to the restarting of the machine for the formation of a second core. The rear of the channel 22 is therefore equipped with a three way cock 23 which may be rotated into either of two positions. This cock is formed with a flange 38 fitting against the flange 37 on the rotatable channel 22. A bearing 41 fits over the flanges 37 and 38. In one of the positions of the cock 23, as shown at b, a communication is established between a pipe 24 leading from the air compressor 16 and the channel 22, the opening 25 through which the cable conductor is normally fed being closed. In the other position of the cock 23 the end of the pipe 24 is closed and a clear passage from the opening 25 into the channel 22 so that a conductor can be fed therethrough. Thus when the end of a conductor has passed out through the die 1, the cock 23 may be turned into position b and compressed air from the compressor 16 is blown through the channel 22 and keeps the way clear for the introduction of the following length of conductor. It is understood that the compressed air passing through pipe 24 may be heated, as for example, by means of an electrical heating coil 26 surrounding the pipe 24 and connected to a suitable source 27 of current. The cock 23 may be automatically rotated from one position to the other by means of a feeler and magnetic switch, as shown in the art. By reversing the direction of feed screw 14 at the same time as compressed air is supplied to channel 22 the extrusion head may rapidly be emptied of thermoplastic material in a simple manner.

The machine described above forms a means for manufacturing pretwisted cores for cables of the kind shown in Fig. 2.

Fig. 2 shows a three conductor cable in which three sector-shaped conductors 32 each composed of a plurality of strands are pretwisted during stranding and are each separately surrounded by sector-shaped extruded insulation 29. The insulation 29 is extruded around a core 32 by means of the machine of Fig. 1 with the rotating die. In addition to the die being rotated at a speed correctly related to the speed of extrusion, the position of the die must be properly phased in relation to that of the conductor 32 as it passes through the machine, and this may be done by well known means such as a feeler contacting the metal conductor 32 and controlling the angular position and the speed of the dieholder 2, Fig. 1, through electric contacts and regulators.

The opening in the die 1 through which the insulation 29 is extruded is formed in the die in such manner that, as the die rotates, the sectors assume the successive angular positions that they will occupy in the finished cable. It will be obvious from Fig. 2 that this opening in die 1 must conform in shape and eccentricity to the cross sectional area of a layer 29, and that the die will therefore be radially unsymmetrical. This opening will rotate around the die axis, which coincides with the axis of tube 22, in step with the apparent movement of a helical conductor 32 a cross section of which in any stationary plane will revolve about this same axis as the conductor advances. Thus, with proper synchronization and phasing, the thickness of the insulant adjacent any portion of the conductive cross section will remain uniform throughout the length of the cable and a desired cross section such as that consisting of a sector 32 surrounded by a suitably formed layer 29, will be obtained.

After each core has been extruded the three cores are laid up together and an outer sheath 31 is applied thereover. This outer sheath 31 may be an elastic outer sheath applied according to U. S. application Serial No. 570,893 and holding the cable under compression.

The extruded insulation 29 may be a natural or synthetic rubber compound, or an organic synthetic thermoplastic such as vinyl resin, cellulose ester or ether, a polymer of acrylic acid or one of its esters, a polymer of an alkyl acrylic acid or one of its esters, polystyrene, a solid polymer of ethylene, or a halogenated polystyrene or solid polymer of ethylene.

It will be noted that in Fig. 2 the sector shaped insulation 29 of each core is unsymmetrically located about the sector shaped conductor 32. The thickness of insulation that covers each straight side of the sector shaped conductor 32, for example, is only half the total thickness of the insulation lying directly between two sector shaped conductors 32. The machine of Fig. 1 lends itself readily to this unsymmetrical extrusion and by making use of such a core configuration, a saving in material is effected as just the correct amount of insulation required between a conductor 32 and the outer circumference of the cable on the one hand and between two conductors 32 on the other hand may be provided, whilst the sector shaped conductors 32 may be located at such radial distance from the axis of the cable as to provide sufficient insulation around the more or less abrupt corners of the sectors 32 as to avoid any breakdown due to concentration of the field at such corners.

What is claimed is:

1. An extrusion machine comprising a die for extrusion of an unsymmetrical body of predetermined lay, means for rotating the die in predetermined relation to the speed of extrusion, and to the said lay, said die being mounted in a rotatable die holder and a gear wheel being fixed externally to said die holder, a die holder cover in which said rotatable die holder is mounted, an extrusion head to which said die holder cover is fixed, a shaft bearing and a thrust bearing provided between said die holder and said die holder cover, and compressed air means provided for compensating the axial thrust on said thrust bearing.

2. An extrusion machine comprising a die for extrusion of an unsymmetrical body with predetermined lay and means for rotating said die in predetermined relation to the speed of extrusion, and to the said lay, and a guide tube for a conductor around which insulation is to be extruded, an extrusion head in which said guide tube is rotatably mounted, a rotatable three-way cock being provided at the rear of said guide tube, one way of said cock being attached to a source of compressed air, said cock being rotatable into two positions in one of which said guide tube is open at the rear and said way connected to the source of compressed air being shut off, while in the other position the end of said guide tube is connected to said source of compressed air.

3. An extrusion machine adapted for extrusion of a substantially helical body with predetermined lay, comprising a radially unsymmetrical die, means for rotating said die in predetermined relation to the speed of extrusion, and to the said lay, a guide tube for a pretwisted conductor around which insulation is to be extruded, and an extrusion head in which said guide tube is mounted in axial alignment with said die, whereby, with proper synchronization and phasing of the rotation of said die with the advance of said pretwisted conductor through said guide tube, an insulated conductor may be formed having uniform cross section of desired configuration.

4. An extrusion machine comprising a rotatable die for extrusion of a substantially helical body with predetermined lay, said die having a single aperture extending through the die and having its axis parallel to but radially spaced from the axis of rotation of the die, means for rotating said die in predetermined relation to the speed of extrusion, and to the said lay, a guide tube for a pretwisted conductor around which insulation is to be extruded, and an extrusion head in which said guide tube is mounted in axial alignment with said die.

HUGO SONNENFELD.

REFERENCES CITED

The following references are of record in the file of this patent:

UNITED STATES PATENTS

| Number | Name | Date |
|---|---|---|
| 1,266,006 | Fisher | May 14, 1918 |
| 1,845,249 | Derby | Feb. 16, 1932 |
| 1,881,917 | Parkhurst | Oct. 11, 1932 |
| 1,993,349 | Parkhurst | Mar. 5, 1935 |
| 2,131,173 | Greenall | Sept 27, 1938 |
| 2,149,002 | Wermine | Feb. 28, 1937 |
| 2,149,772 | Hunter et al. | Mar. 7, 1939 |
| 2,191,829 | Johnson | Feb. 27, 1940 |
| 2,258,025 | Morris et al. | Oct. 7, 1941 |
| 2,286,922 | Muller | June 16, 1942 |

FOREIGN PATENTS

| Number | Country | Date |
|---|---|---|
| 74,691 | Australia | Sept. 25, 1918 |